UNITED STATES PATENT OFFICE

DAVID E. BREINIG, OF BROOKLYN, NEW YORK.

IMPROVEMENT IN DISINFECTING-PAINTS.

Specification forming part of Letters Patent No. 210,664, dated December 10, 1878; application filed October 9, 1878.

*To all whom it may concern:*

Be it known that I, DAVID E. BREINIG, of Brooklyn, county of Kings, State of New York, have invented a new and useful Improved Disinfecting-Paint, which is fully set forth in the following specification.

It is well known that in some epidemics the primary cause is to be sought either in vegetable or animal decomposition, by which the atmosphere is impregnated with the poisonous germs or animalcula. A sick-chamber in an infected district will impregnate the atmosphere within and without itself, and after the patient is removed, in spite of the greatest cleanliness, the chamber will still be filled with the poison, so that not only the clothes or bedding will be infected, but the entire room. So, after the patient is removed, and all the clothing and furniture burned, perhaps, still the poison or animalcula are deposited on the floor and walls, and an occupant is as liable to take the infectious disease as if nothing had been done. This is a fact so well established that sanitary commissions have the apartment disinfected as soon as the patient is removed. This is generally done by burning sulphur in the chamber, which is very injurious to the occupants, and, for the most part, is imperfectly done, and if done to the extent that it will destroy all animalcula, it will also destroy all the painting; therefore the apartment has to be both kalsomined and repainted.

The object of my invention is to produce a disinfectant that will destroy without fail any germ deposited on the walls or floor, and at the same time beautify. Hence my combination of carbolic acid, with or without oil of thyme, with oils and pigments so prepared that it may be used as a varnish, paint, or size, which, when applied to the walls, floor, &c., will disinfect the air and destroy the germs on the walls or floor of the apartment, and at the same time beautify the apartments.

I find the more stone-hard the coating becomes the more permanent and durable it will be, although any of the drying-oils and any of the pigments, if so prepared that the carbolic acid will combine, will answer.

I hereby declare that the following is a full, clear, and exact description of my discovery and its preparation.

I first prepare a metalline gum, as described in my Patent No. 54,462, dated May 1, 1866. I place one hundred pounds of the metalline gum in a suitable vessel over a fire, and bring the heat to 220° or 225°, to evaporate all the water that adheres to the gum. Then I add from seventy to one hundred pounds of silicic acid or feldspar, bringing the heat up to from 500° to 800°, so that the silicic acid or spar will combine with the metalline gum. Then I add from fifteen to thirty per cent. gum-shellac, five per cent. red lead, five per cent. manganese, and five gallons of boiled or raw linseed-oil. I then boil it until it is all combined, and add sufficient spirits of turpentine to make it of the consistency of heavy varnish, and add to every one hundred gallons twenty-five pounds of crystals of carbolic acid, by first dissolving the crystals in ten per cent. of water. Mix it well, and bring the whole to from 155° to 170° Fahrenheit.

What I claim as my invention, and desire to secure by Letters Patent, is—

The composition herein described, consisting of silicic acid or feldspar, metalline gum, shellac, linseed-oil, red lead, manganese, carbolic acid, and spirits of turpentine, prepared substantially as described, for a disinfecting-paint.

DAVID E. BREINIG.

Witnesses:
S. J. GORDON,
JOHN W. RIPLEY.